(12) United States Patent
Yamada et al.

(10) Patent No.: US 9,188,211 B2
(45) Date of Patent: Nov. 17, 2015

(54) ROLLER SCREW

(75) Inventors: Hiroyuki Yamada, Tokyo (JP); Isao Hayase, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/364,490

(22) PCT Filed: Dec. 14, 2011

(86) PCT No.: PCT/JP2011/078943
§ 371 (c)(1),
(2), (4) Date: Jun. 11, 2014

(87) PCT Pub. No.: WO2013/088532
PCT Pub. Date: Jun. 20, 2013

(65) Prior Publication Data
US 2014/0338487 A1    Nov. 20, 2014

(51) Int. Cl.
*F16H 25/24*     (2006.01)
*F16H 25/22*     (2006.01)

(52) U.S. Cl.
CPC ........ *F16H 25/2247* (2013.01); *F16H 25/2261* (2013.01); *Y10T 74/19791* (2015.01)

(58) Field of Classification Search
CPC .............................. F16H 25/2247; F16H 25/24
USPC ............................... 74/89.23, 424.89, 424.91
See application file for complete search history.

(56) References Cited

U.S. PATENT DOCUMENTS

| 3,802,290 A * | 4/1974 | Grove et al. ............... 74/424.91 |
| 2011/0179896 A1* | 7/2011 | Hiraku et al. ............... 74/424.9 |
| 2012/0012425 A1 | 1/2012 | Hayase et al. |
| 2012/0111669 A1* | 5/2012 | Hayase et al. ............... 187/237 |
| 2012/0174691 A1 | 7/2012 | Yamada et al. |
| 2013/0160583 A1* | 6/2013 | Kai et al. ..................... 74/89.23 |

FOREIGN PATENT DOCUMENTS

| JP | 60-127818 U | 8/1985 |
| JP | 4-129957 U | 11/1992 |
| JP | 2010-53933 A | 3/2010 |
| JP | 2010-169205 A | 8/2010 |
| JP | 2011-69449 A | 4/2011 |

OTHER PUBLICATIONS

International Search Report dated Jan. 31, 2012 with English translation (five (5) pages).

* cited by examiner

*Primary Examiner* — William Kelleher
*Assistant Examiner* — Leonard J Archuleta
(74) *Attorney, Agent, or Firm* — Crowell & Moring LLP

(57) ABSTRACT

In a roller screw (1) having a screw shaft (2), a plurality of rollers (4) that roll on a flank face (21a) of the screw shaft; and a cage (3) that rotatably houses the plurality of rollers, a plurality of roller groups (40) each having a plurality of rollers arranged at equal intervals while contacting with the same flank face along a spiral groove of the screw shaft for one lead are provided, and the plurality of roller groups are arranged at intervals in the axial direction of the screw shaft. With this configuration, the size of the nut portion in the axial direction of the screw shaft can be prevented from being bloated, and the load distribution in a circumferential direction of the screw shaft can be uniformized.

5 Claims, 8 Drawing Sheets

ROLLER SCREW

TECHNICAL FIELD

The present invention relates to a roller screw having a screw shaft, and a nut screwed with the screw shaft through a plurality of rollers.

BACKGROUND ART

Ball screws are frequently used in a feed drive mechanism for machine tools, and a hydraulic drive system is frequently used in a feed drive mechanism which is subjected to a high load such as mold clamping in an injection molding machine. Further, in recent years, in the latter case, an action for replacing a hydraulic pressure with an electric operation is accelerated from the viewpoints of a reduction in power consumption or an improvement in maintenance property, and an improvement in a high-load resistant performance is required even in a rotation/linear motion conversion mechanism such as a ball screw mounted on an electric linear feed device.

Under the above background, a roller screw disclosed in Japanese Unexamined Patent Application Publication No. 2010-169205 has been developed. In this roller screw, a rolling body on the screw shaft is changed from a ball to a roller so that a contact area of the screw shaft and the rolling body (roller) is increased, and a curvature of a roller rolling surface is decreased (diameter is increased) to reduce a contact stress between the roller and the screw shaft.

CITATION LIST

Patent Literature

Patent literature 1: Japanese Unexamined Patent Application Publication No. 2010-169205

SUMMARY OF INVENTION

Technical Problem

In the roller screw of the above document, the number of rollers is set to three. This is attributable to a fact that the productivity of the roller screws is prioritized. As compared with a case in which four or more rollers are provided, even if a slight dimensional error is present in components, all of the rollers and the screw shaft can come in sure contact with each other.

On the contrary, in the roller screw assumed to be used under the environment where an extremely high load is exerted on the roller screw, there may be a need to prioritize the high-load resistance over the productivity, and set the number of rollers to four or more (for example, several tens). However, in that case, in a nut portion that supports the plurality of rollers, there is a concern that a size of the screw shaft in an axial direction thereof is increased more than necessary, contact portions of the screw shaft and the plurality of rollers are arranged to be biased in a circumferential direction of the screw shaft, and the non-uniformity of a load distribution in the plurality of rollers is increased. For that reason, there is a need to consider an appropriate geometric arrangement of the plural rollers.

An object of the present invention is to provide a roller screw that can prevent the size of the nut portion that supports plural rollers that contact with the screw shaft in the axial direction of the screw shaft from being bloated, and is excellent in the uniformity of the load distribution in the plural rollers.

Solution to Problem

In order to achieve the above object, according to the present invention, there is provided a roller screw having a screw shaft, a plurality of rollers that roll on a flank face of the screw shaft, and a cage that rotatably houses the plurality of rollers, in which a plurality of roller groups each having a plurality of rollers arranged at equal intervals while contacting with the same flank face along a spiral groove of the screw shaft for one lead are provided, and in which the plurality of roller groups are arranged at intervals in the axial direction of the screw shaft.

Advantageous Effects of Invention

According to the present invention, the size of the nut portion in the axial direction of the screw shaft can be prevented from being bloated, and the load distribution in the plural rollers can be uniformized.

DESCRIPTION OF EMBODIMENTS

Hereinafter, embodiments of the present invention will be described with reference to the drawings. In the respective drawings, the same parts are denoted by identical symbols. Also, in the following description, when a plurality of identical components are provided, if discrimination between the respective components is necessary, small letters of different alphabets are added to common numeral references for discriminating the respective components. If no discrimination is necessary, the small letters of the alphabets may be appropriately omitted.

Figure 1:
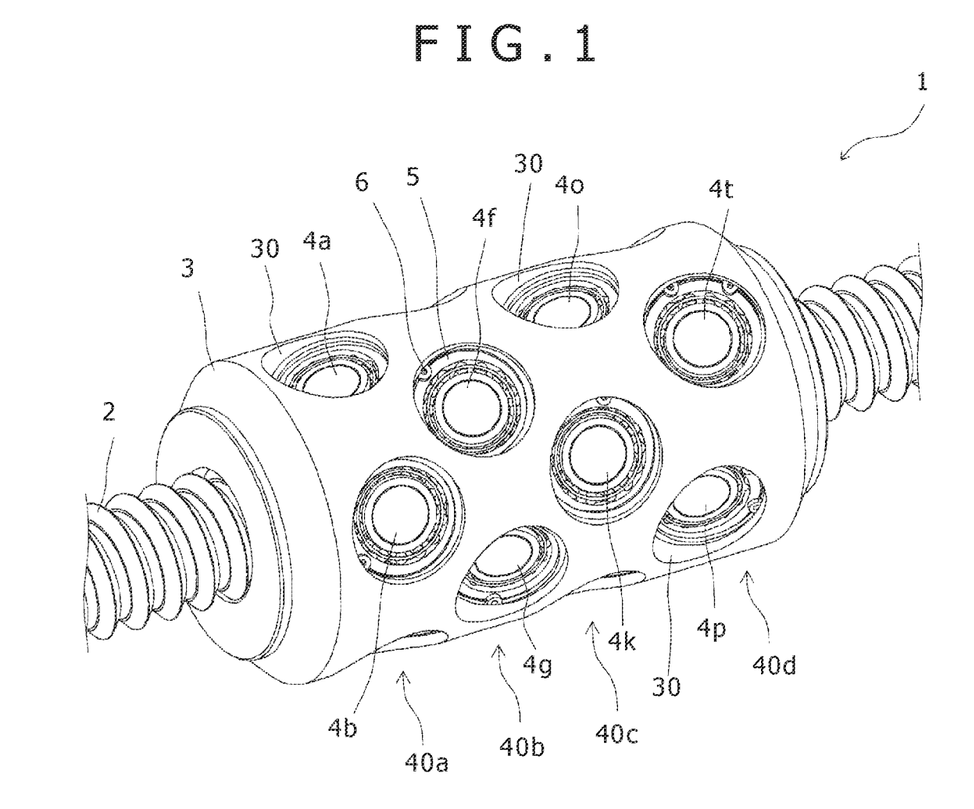
FIG. 1 is a perspective view of a roller screw according to a first embodiment of the present invention.
Figure 2:
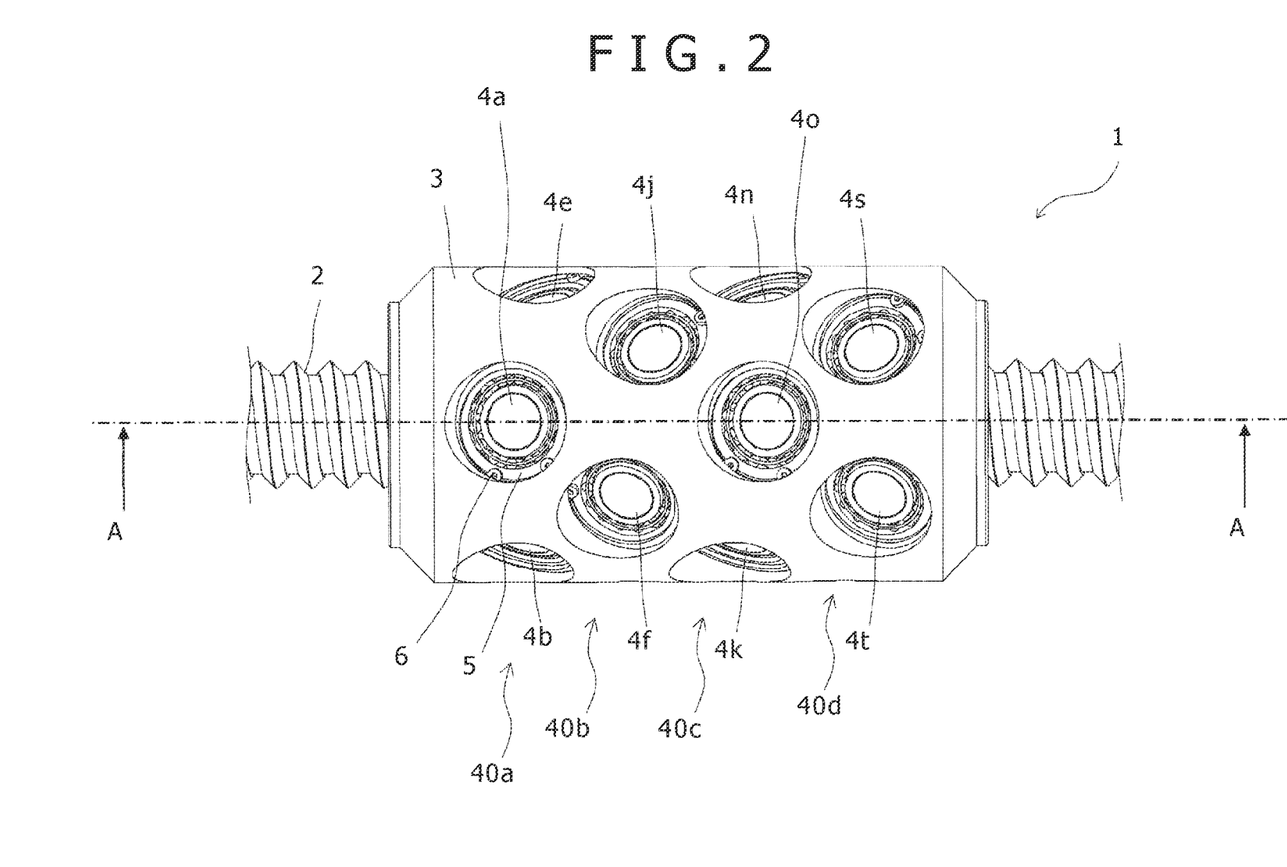
FIG. 2 is a side view of the roller screw according to the first embodiment of the present invention.
Figure 3:
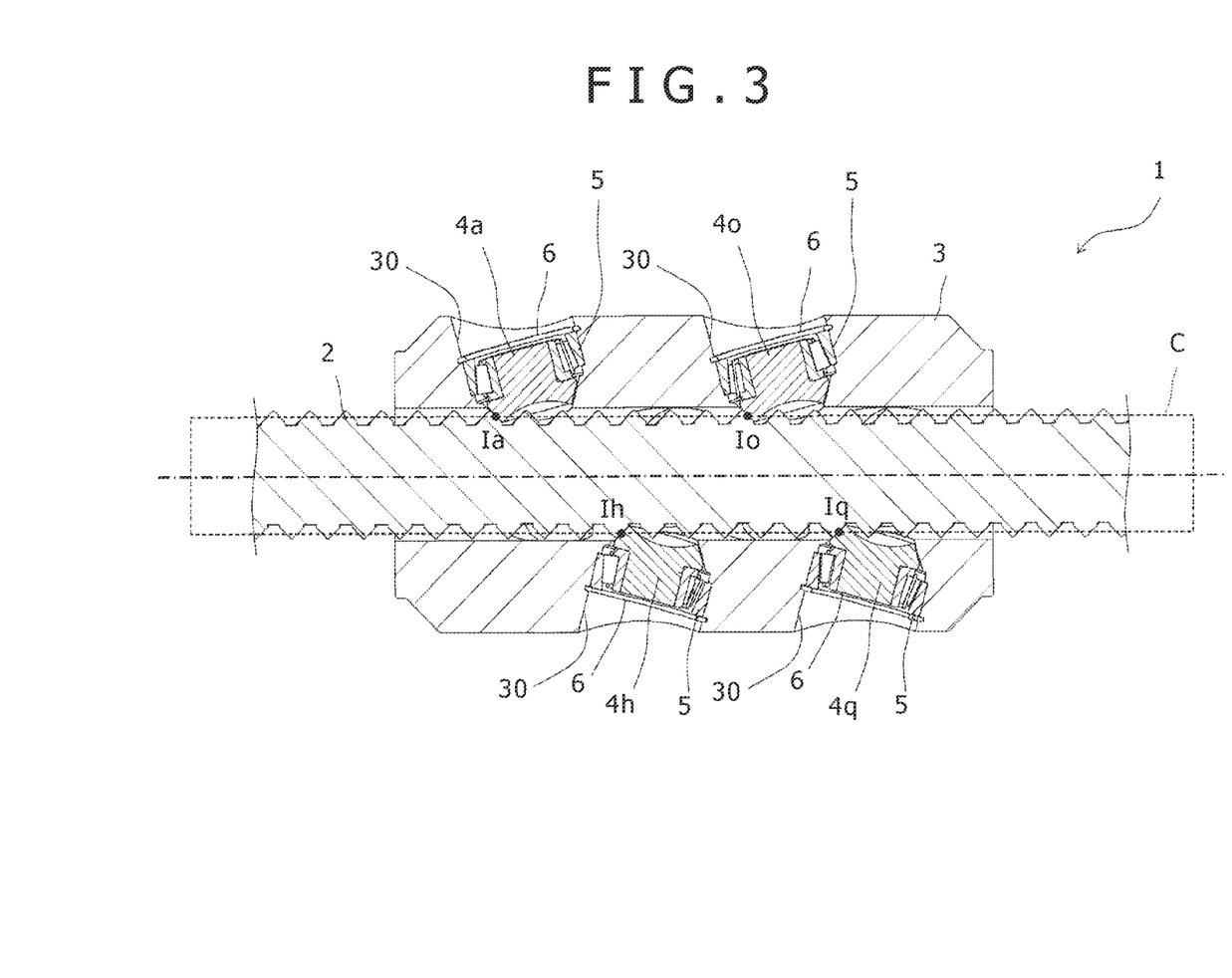
FIG. 3 is a side cross-sectional view of the roller screw according to the first embodiment of the present invention.
Figure 4:
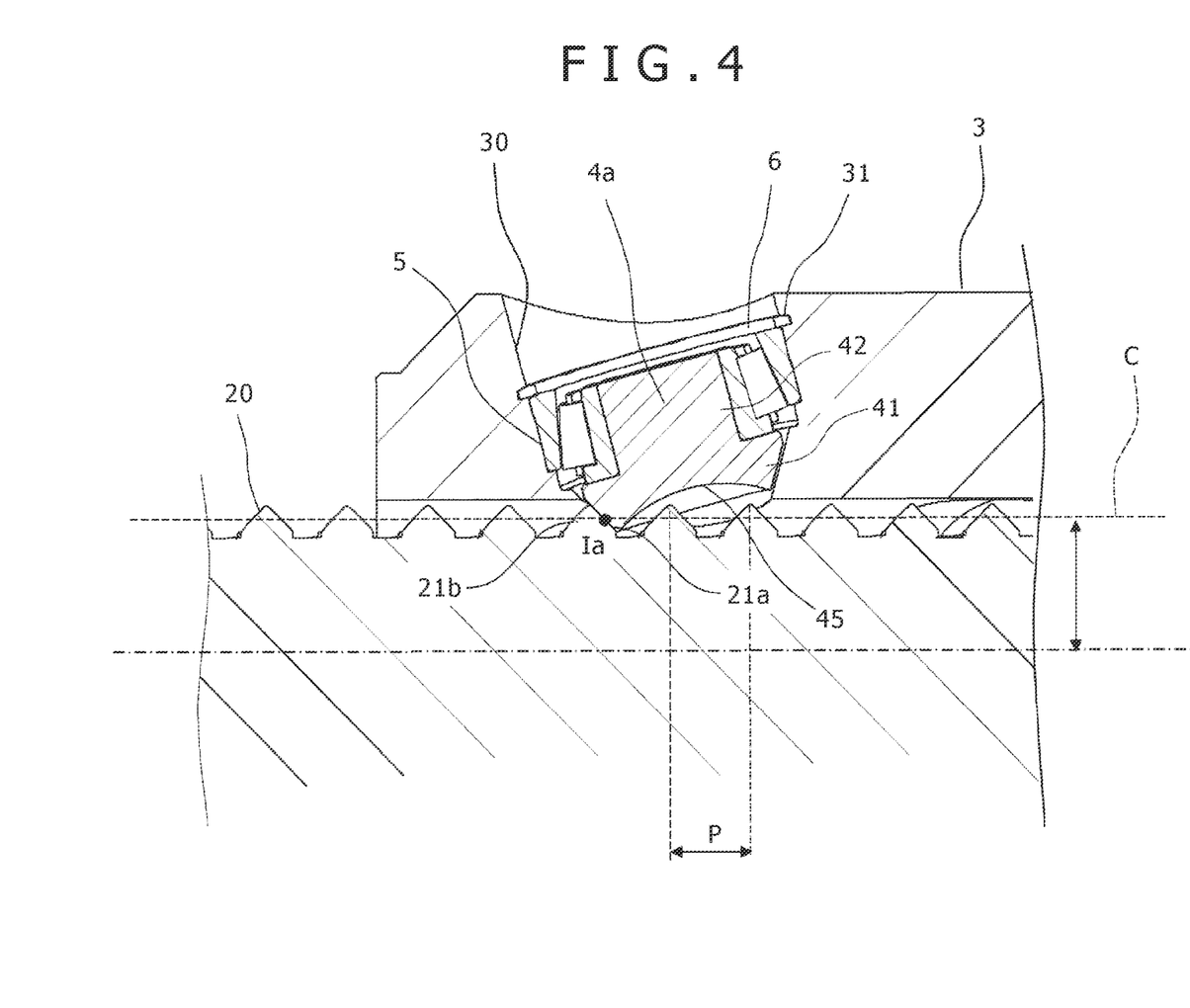
FIG. 4 is an enlarged view of a neighborhood of a roller 4*a* in FIG. 3.

FIG. 1 is a perspective view of a roller screw according to a first embodiment of the present invention. FIG. 2 is a side view of the roller screw illustrated in FIG. 1. FIG. 3 is a cross-sectional view taken along a line A-A. FIG. 4 is an enlarged view of a neighborhood of a roller 4*a* in FIG. 3.

A roller screw 1 illustrated in those figures includes a screw shaft 2, a plurality of roller groups 40 (40*a*, 40*b*, 40*c*, and 40*d*) arranged at given intervals in an axial direction of the screw shaft 2, a plurality of roller bearings 5 that rotatably support a plurality of rollers 4 included in each of the roller groups 40, and a nut cage 3 to which the plurality of roller bearings 5 are fixed, and which rotates relative to the screw shaft 2.

The screw shaft 2 is a single-thread screw, and a thread 20 (spiral groove) (refer to FIG. 4) spirally formed is provided in an outer periphery of the screw shaft 2. As illustrated in FIG. 4, the thread 20 (spiral groove) is formed of two flank faces 21 (21*a*, 21*b*) inclined in different directions. In the following description, it is assumed that the flank face located on a right side of each thread 20 is a right flank face 21*a*, and the flank face located on a left side is a left flank face 21*b*.

Each of the roller groups 40*a*, 40*b*, 40*c*, 40*c*, and 40*d* is configured by a plurality of rollers 4 arranged at equal intervals along the spiral groove 20 of the screw shaft 2 for one lead. The plurality of roller groups 40*a*, 40*b*, 40*c*, 40*c*, and 40*d* are arranged at intervals in the axial direction of the screw shaft 2. All of the rollers 4 (that is, all of rollers 4*a* to 4*t* included in the roller screw 1) included in the respective roller groups 40*a*, 40*b*, 40*c*, 40*c*, and 40*d* come in contact with the same flank faces (right flank faces 21*a*) in the screw shaft 2. When the number of rollers 4 included in a given roller group 40 is N, and the given roller group 40 is viewed from the axial direction of the screw shaft 2, respective adjacent rollers 4 in the given roller group 40 are arranged with the displacement of $2\pi N$ [rad]. The roller screw 1 according to this embodiment includes four roller groups 40*a*, 40*b*, 40*c*, 40*c*, and 40*d* each having five rollers 4, and 20 rollers 4*a* to 4*t* in total are housed in the nut cage 3. When the respective roller groups 40*a* to 40*d* are viewed from the axial direction of the screw shaft 2, the adjacent rollers 4 in the respective roller groups 40*a* to 40*d* are arranged with the displacement of 72 degrees in the circumferential direction of the screw shaft 2 (refer to FIG. 6 which will be described later).

As illustrated in FIG. 4, each of the rollers 4 included in the roller groups 40 includes a rolling portion 41 and a shaft portion 42. The rolling portion 41 is formed into a partially conical shape in which a vertex portion is removed from a cone, and supported so that a vertex side of the cone is located on the side of the screw shaft 2. The shaft portion 42 is a cylindrical portion projected from a bottom side of the conical rolling portion 41, and having a center shaft (rotating shaft) common to the rolling portion 41. The rolling portion 41 comes in linear contact with the right flank face 21*a* through a conical side surface. When the rolling portion 41 thus comes in linear contact with the right flank face 21*a*, a Hertz stress is reduced so that durability to flaking can be improved. When the screw shaft 2 or the nut cage 3 rotates, each roller 4 rolls on the right flank face 21*a* of the screw shaft 2 through the rolling portion 41. A plurality of rollers housed in the roller bearings 5 are arranged on the outer periphery of the shaft portion 42, and the shaft portion 42 is rotatably supported by each of the roller hearings 5. The number of rollers 4 included in the roller screw 1 is not particularly limited, but is preferably four or more from the viewpoint of an improvement in the high-load resistance. As already described above, in this embodiment, 20 rollers 4*a* to 4*s* are supported by the nut cage 3.

Incidentally, in FIG. 4, a cylinder C having the same center axis as than of the screw shaft 2, and having a cylindrical surface intersecting with portions (contact portions) at which the respective rollers 4 contact with the right flank faces 21*a* is virtually set, and points at which the contact portions intersect with the virtual cylinder C are indicated by I. Subscripts of the intersection points I correspond to subscripts of the rollers 4. For example, an intersection point Ia in FIG. 4 indicates an intersection point between the roller 4*a* and the virtual cylinder C.

Also, although apparent from FIG. 4, a diameter of the screw shaft 2 side in the rolling portion 41 according to this embodiment is set to be larger than a pitch P (refer to FIG. 4) of the screw shaft 2. When the diameter of the rolling portion 41 is set to be larger, the Hertz stress generated between the rolling portion 41 and the right flank face 21*a* can be reduced. Also, a cone-shaped recess 45 (refer to FIG. 4) is formed in an end surface of the screw shaft 2 side of the rolling portion 41. When the diameter of the rolling portion 41 is set to be larger than the pitch of the screw shaft 2 as in this embodiment, there is a high possibility that the rolling portion 41 interferes with the thread 20. When the recess 45 is formed in the rolling portion 41 as in this embodiment, the thread 20 can be housed within the recess 45 with the result that the interference between the recess 45 and the thread 20 can be prevented. Also, with the formation of the recess 45, even if the amount of inclination of the rotational axis of the rollers 4 toward the thread 20 side is small, the rolling portion 41 is prevented from interfering with the thread 20 of the adjacent pitch. When the amount of inclination of the rotational axis is thus reduced, an outer diameter of the nut cage 3 can be suppressed even if the diameter of the rolling portion 41 is the same.

The nut cage 3 is a substantially cylindrical member internally having a hollow portion for inserting the screw shaft 2 therein. Holes 30 for housing roller bearings 5 therein are formed in the same number as that of the rollers 4. An annular groove 31 (refer to FIG. 4) for fitting a retaining ring 6 is disposed on an inner periphery of each hole 30. When the retaining ring 6 is fitted to the groove 31 in a state where the roller 4 and the roller bearing 5 are inserted into each hole 30, the roller bearing 5 is fixed to the nut cage 3. The nut cage 3 and the screw shaft 2 contact with each other through the rolling portions 41 of the rollers 4, and come out of contact with each other in other portions.

The respective roller bearings 5 fixed to the nut cage 3 rotatably support the rollers 4. That is, the rollers 4 are rotatable with respect to the nut cage 3. In the example shown in the figure, the roller bearings 5 are each configured by the conical roller bearing that can bear an axial load and a radial load exerted from the rollers 4 by one bearing. Alternatively, another type of bearings may be used.

In the roller screw 1 configured as described above, when the respective rollers 4 roll on the thread 20 (right flank face 21*a*), the nut cage 3 rotate relatively to the screw shaft 2. As a result, a relative linear motion is generated between the screw shaft 2 and the nut cage 3.

The retaining ring 6 shown in the figure is a bevel retaining ring in which a portion fitted into the groove 31 is formed into an inclined shape. Alternatively, another type of retaining ring (for example, C-type retaining ring) may be used. As in this embodiment, when the roller bearing (conical roller bearing) 5 that can bear the axial load and the radial load by one bearing is fixed by the bevel retaining ring 6. As a result, the roller bearings 5 can be fixed to the nut cage 3 without any gap in the axial direction (rotating axial direction of the rollers 4) of the roller bearings 5.

Figure 5:
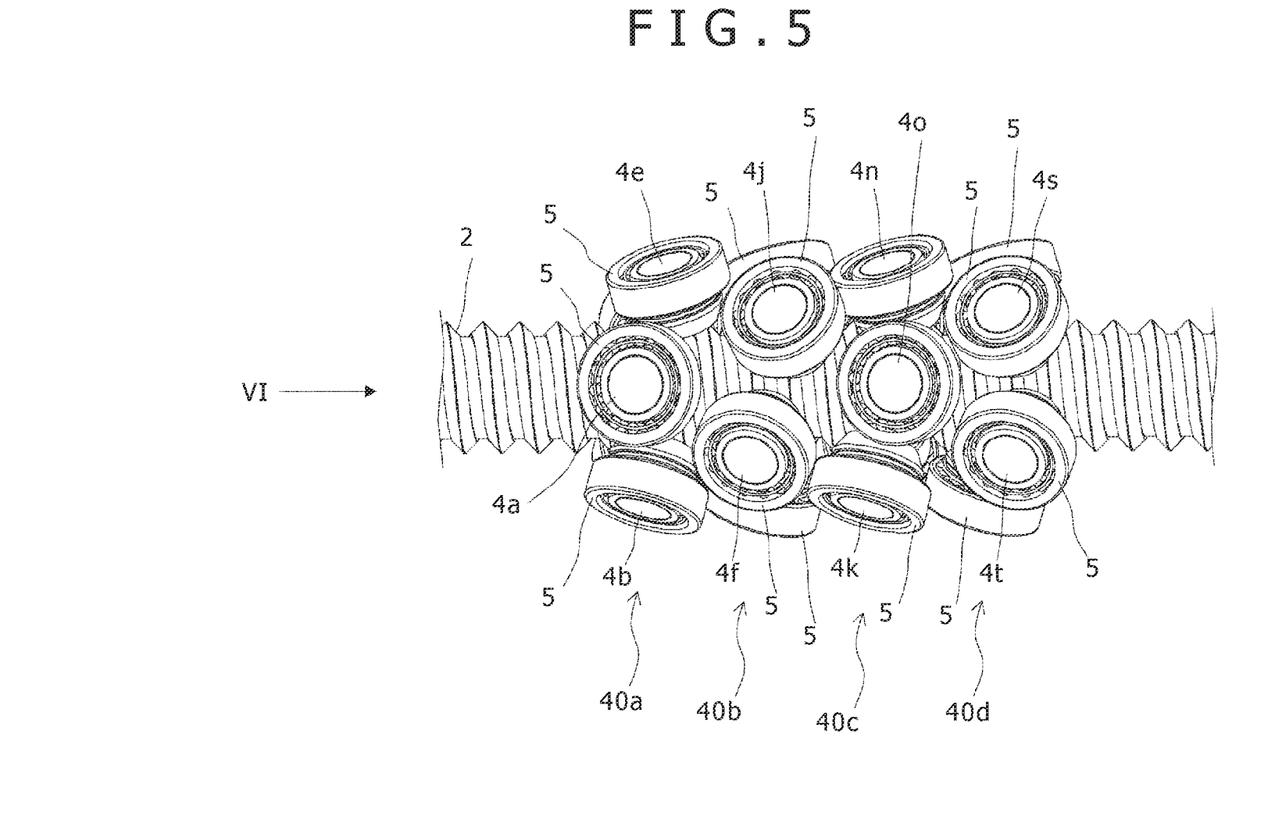
FIG. 5 is a side view of a screw shaft, rollers, and bearings according to the first embodiment of the present invention.
Figure 6:
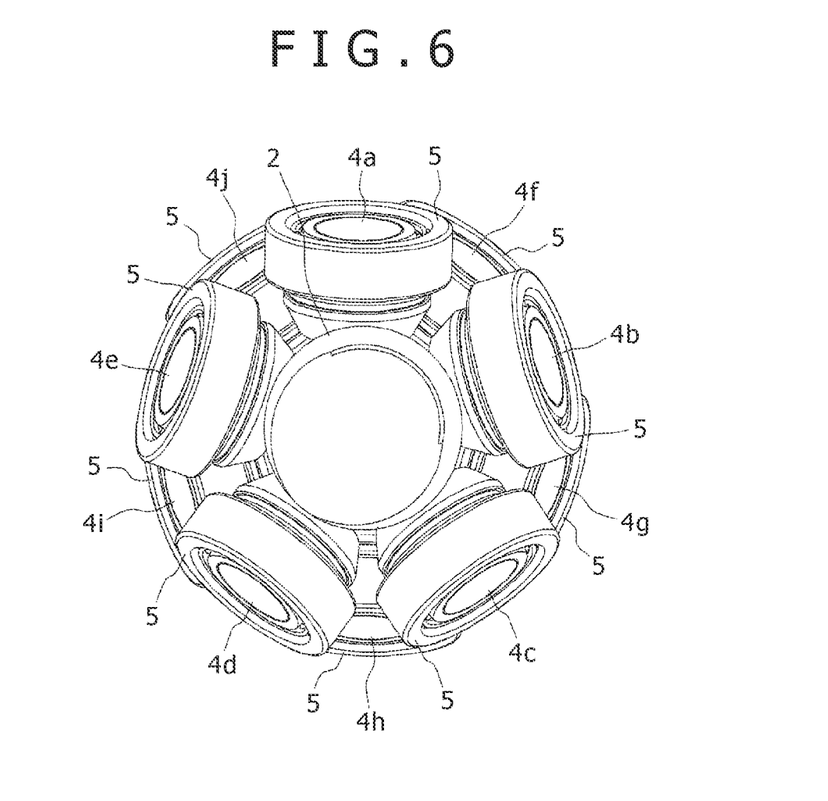
FIG. 6 is a front view of the screw shaft, the rollers, and the bearings according to the first embodiment of the present invention.
Figure 7:
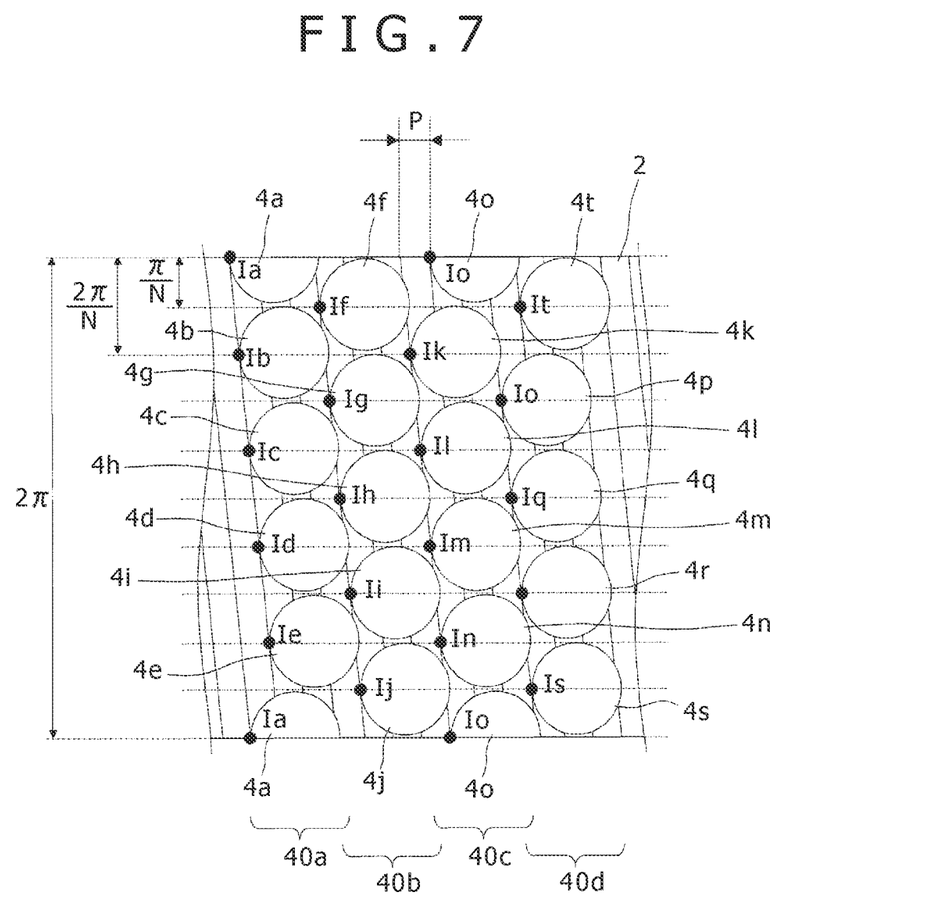
FIG. 7 is a development view of the screw shaft and the rollers according to the first embodiment of the present invention.

Subsequently, a roller arrangement in the roller screw according to the first embodiment of the present invention will be described with reference to the drawings. FIG. 5 is a side view illustrating only the screw shaft, the rollers, and the roller bearings according to the first embodiment of the present invention. FIG. 6 is a front view of the screw shaft, the rollers, and the bearings viewed from a direction of an arrow VI in FIG. 5. FIG. 7 is a development view of the screw shaft and the rollers in the roller screw according to the first embodiment of the present invention. Points Ia to It in FIG. 7 are intersection points between portions where the rollers 4a to 4t come in contact with the right flank face 21a, and the cylinder C (refer to FIG. 4). In FIG. 7, the spiral groove of the screw shaft 2 for one lead is simply illustrated by one diagonal line, and the rollers 4 are simply illustrated by circles.

As already described above, the roller screw 1 according to this embodiment is configured by 20 rollers 4a to 4t in total. The rollers 4a, 4b, 4c, 4d, and 4e configure the first roller group 40a, the rollers 4f, 4g, 4h, 4i, and 4j configure the second roller group 40b, the rollers 4k, 4l, 4m, 4n, and 4o configure the third roller group 40c, and the rollers 4p, 4q, 4r, 4s, and 4t configure the fourth roller group 40d.

As illustrated in those figures, the adjacent roller groups 40 of the four roller groups 40 in the axial direction of the screw shaft 2 are arranged in the axial direction of the screw shaft 2 through an interval larger than a length of the screw shaft 2 for one lead. This is because outer diameters of the rollers 4 and the roller bearings 5 are larger than one lead of the screw shaft 2. In this embodiment, the two adjacent roller groups 40 (for example, roller group 40a and the roller group 40b) in the axial direction of the screw shaft 2 are arranged at an interval as long as three leads.

Also, when one roller group of the four roller groups 40, and another roller group adjacent to the one roller group are viewed from the axial direction of the screw shaft 2, arrangement positions (or positions of the intersection points I between the respective rollers 4 and the virtual cylinder C) of the plural rollers 4 in both of the one roller group and the another roller group are different from each other (refer to FIGS. 6 and 7). When viewed from the axial direction of the screw shaft 2, each roller 4 within the another roller group is arranged to be positioned between the respective rollers 4 within the one roller group 40 (refer to FIGS. 5 and 7). That is, as illustrated in FIG. 7, the arrangement positions of the plural rollers 4 in the circumferential direction of the screw shaft 2 are different between the first roller group 40a and the second roller group 40b. With the above arrangement, each roller 4 within the second roller group 40b is arranged between the respective rollers 4 within the first roller group 40a (for example, the roller 4f is arranged between the roller 4a and the roller 4b).

As illustrated in FIG. 7, in this embodiment, N rollers 4 included in the respective roller groups 40 are arranged around the screw shaft 2 with the displacement of $2\pi/N$ [rad], and arranged with the displacement of $\pi/N$ [rad] which is half of $2\pi/N$ from the plural rollers 4 included in the adjacent roller groups 40. That is, the rollers 4a, 4b, 4c, 4d, and 4e in the first roller group 40a, and the rollers 4f, 4g, 4h, 4i, and 4g in the second roller group 40b are arranged with the displacement of $\pi/5$ [rad] (that is, 36 degrees) from each other when viewed from the axial direction of the screw shaft 2.

Incidentally, a maximum number of the rollers 4 that can be included in the respective roller groups 40, that is, a maximum number of the rollers 4 that can be arranged in the spiral groove (right, flank face 21a) for one lead is determined according to an outer diameter of the screw shaft 2, a shape of the rollers 4, and an outer diameter of the roller bearings 5. In this example, "can be arranged" means that the nut cage 3 has a sufficient strength without interference of the adjacent roller bearings 5 with each other within the roller groups 40, and with the provision of the holes 30 for inserting the roller bearings 5 into the nut cage 3 in the nut cage 3. In this example, when it is assumed that the maximum number of rollers 4 that can be arranged in the spiral groove for one lead is Nmax, Nmax=5 is satisfied in the roller screw 1 according to this embodiment. For that reason, in the respective roller groups 40a to 40d, the respective five rollers 4 are arranged at equal intervals in the spiral groove 20 for one lead.

Nmax can be roughly determined according to the outer diameter of the screw shaft 2 and the outer diameter of the roller bearings 5. When the outer diameter of the roller bearings 5 is at least about 2.1 times as large as the outer diameter of the screw shaft 2, Nmax=2 is satisfied. When the outer diameter of the roller bearings 5 is between about 1.3 times and 2.1 times, Nmax=3 is satisfied. When the outer diameter of the roller bearings 5 is between about 1.0 times and 1.3 times, Nmax=4 is satisfied. When the outer diameter of the roller bearings 5 is between about 0.8 times and 1.0 times, Nmax=5 is satisfied. Thus, as the outer diameter of the roller bearings 5 is further smaller than the outer diameter of the screw shaft 2, Nmax becomes larger, and a larger number of rollers 4 can be arranged in the spiral groove for one lead.

According to the roller screw 1 configured as described above, first, as compared with a case in which the positions of the rollers 4 in the respective roller groups 40 viewed from the axial direction of the screw shaft 2 match each other, the axial length of the nut cage 3 can be shortened. When the arrangement of all the rollers 4 included in the roller screw 1 is viewed along the spiral groove 20 of the screw shaft 2, in this embodiment, intervals X (for example, an interval between the roller 4a and the roller 4b) of the rollers 4 within the roller groups 40 are equal to each other. However, an interval Y (for example, an interval between the roller 4e and the roller 4f) between a roller 4 finally located within one roller group 10 and a roller 4 first located within another roller group 40 adjacent to the one roller group 40 is larger than the interval X (for example, for several leads). For that reason, when the spiral groove 20 of the screw shaft 2 is developed as one line, the arrangement intervals of the rollers 4 can be formed with dense portions (portions of the interval X) and coarse portions (portions of the interval Y). With this dense and coarse arrangement, the size of the nut cage 3 can be shortened. In particular, in this embodiment, when viewed from the axial direction of the screw shaft 2, each roller 4 within the another roller group 40 is arranged to be positioned between the respective rollers 4 within the one roller group 40. With this configuration, the intervals of the respective roller groups 40 in the axial direction of the screw shaft 2 are minimized.

According to the roller screw 1 according to this embodiment, non-uniformity of the load distribution in the plurality of rollers 4 can be prevented from increasing. For example, when the rollers are biased in the circumferential direction of the screw shaft, not only the non-uniformity of the load distribution in the circumferential direction of the screw shaft is increased, but also an unnecessary moment (moment around an axis intersecting with the rotating axis of the screw shaft other than a moment around the rotating axis of the screw shaft) is generated between the screw shaft and the nut cage. This leads to a risk that the non-uniformity of the load distribution in the axial direction of the screw shaft also increases. On the contrary, according to this embodiment, as illustrated in FIG. 6, the contact portions of the screw shaft 2 and the rollers 4 can be arranged equally in $2\pi$ [rad] within the respective roller groups 40. Also, as illustrated in FIG. 7, the contact portions can be arranged with the displacement of $\pi/N$ [rad] between the respective roller groups 40. With the above configuration, the rollers are not biased in the circumferential direction of the screw shaft 2, and the non-uniformity of the load distribution in the circumferential direction and the axial direction of the screw shaft can be prevented from increasing.

Also, according to the roller screw 1 of this embodiment, a reduction in bending rigidity of the nut cage 3 in the axial direction of the screw shaft 2 can be suppressed. If the plurality of rollers 4 included in the adjacent roller groups 40 are not arranged with the displacement of π/N from each other, and are aligned in the axial direction of the screw shaft 2, the plurality of holes 30 located at the same position in the circumferential direction of the nut cage 3 are arrayed in the number of roller groups 40 along the axial direction of the screw shaft 2. That is, the plurality of holes 30 are arranged coaxially. As the number of holes 30 arranged coaxially is larger, the bending rigidity of those portions becomes lower, thereby adversely affecting the strength of the roller screw 1, and the positioning precision.

However, in this embodiment, when viewed from the axial direction of the screw shaft 2, the plurality of rollers 4 included in the adjacent roller groups 40 are arranged with the displacement from each other, and the number of holes 30 arranged coaxially can be suppressed. As a result, the bending rigidity of the nut cage 3 can be prevented from being lowered. Specifically, in this embodiment, since the plurality of rollers 4 included in the adjacent roller groups 40 are arranged with the displacement of π/N from each other, only the holes 30 of half (half of the total number+1 of the roller groups 40 when the odd number of roller groups 40 are arranged) of the total number of the roller groups 40 are arrayed in the axial direction.

Figure 8:
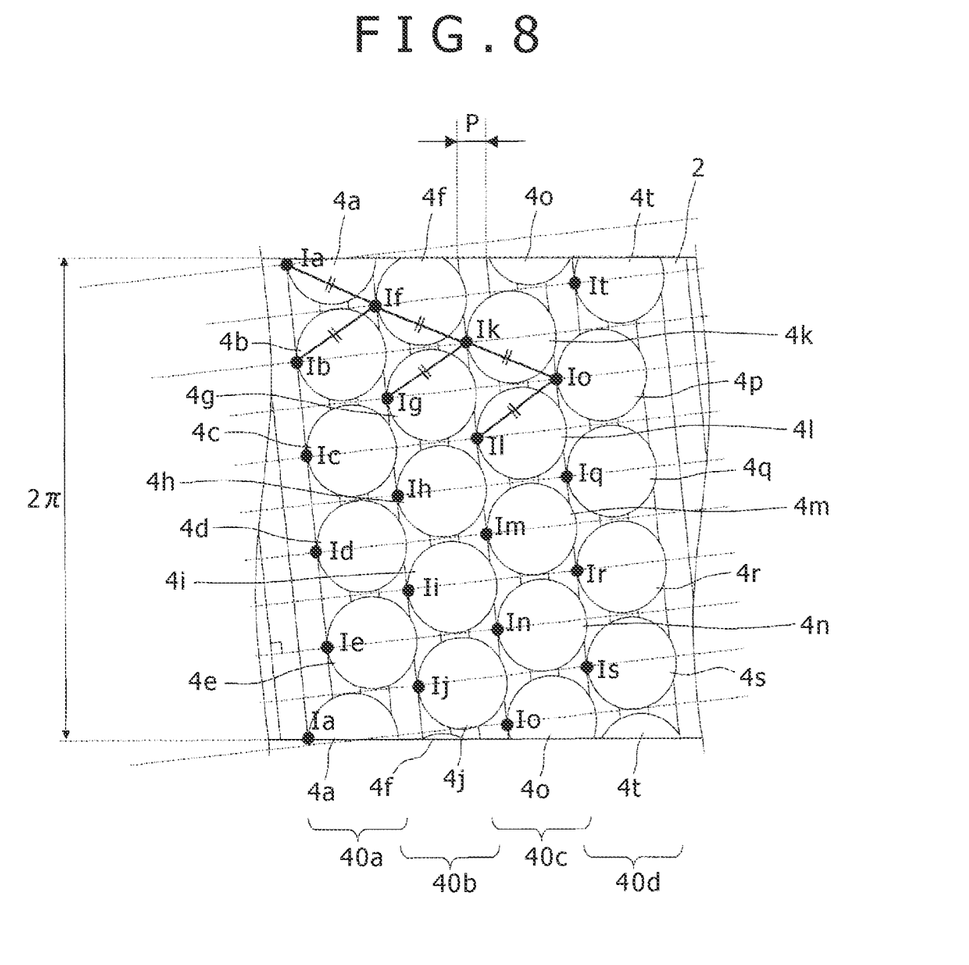
FIG. 8 is a development view of the screw shaft and the rollers according to a second embodiment of the present invention.

Incidentally, the rollers 4 in the respective roller groups 40 may be arranged as follows, except for the arrangements described above. FIG. 8 is a development view of the screw shaft and the rollers in the roller screw according to a second embodiment of the present invention. As in FIG. 7, the spiral groove 20 of the screw shaft 2 for one lead is simply illustrated by one diagonal line, and the rollers 4 are simply illustrated by circles.

As in the roller screw of the first embodiment, the roller screw according to the second embodiment includes the screw shaft 2, the nut Cage 3, the roller bearing 5, and the retaining ring 6 as the components, and the relationships of the respective components are identical with those is the first embodiment. For that reason, a drawing of the overall configuration is omitted, and only a development diagram is illustrated. A different of the second embodiment from the first embodiment resides in the arrangement of the rollers 4. The first embodiment is identical with the second embodiment in that N rollers 4 are arranged in the spiral groove 20 for one lead to configure the roller groups 40, but different from the second embodiment in the arrangement of the rollers 4 in the adjacent roller groups 40 in the axial direction.

As illustrated in FIG. 8, even in this embodiment, as in the first embodiment, the positions of the intersection points I (for example, intersection points Ia, Ib, Ic, Id, and Ie of the first roller group 40a) of the rollers 4 included in one roller group 40, and intersection points I (for example, intersection points If, Ig, Ih, Ii, and Ij of the second roller group 40b) of the rollers 4 included in another roller group 40 adjacent to the one roller group 40, in the circumferential direction of the screw shaft 2 are different from each other. However, in this embodiment, the distances from two intersection points I of the two adjacent rollers 4 within the one roller group 40 to an intersection point I of one roller located between the two adjacent rollers 4 when the another roller group 40 is viewed from the axial direction of the screw shaft 2 are equal to each other. That is, for example, in the example of FIG. 8, the distances from the two intersection points Ia and Ib of the first roller group 40a to one intersection point If of the second roller group 40b are equal to each other. With the above configuration of the roller screw, the intervals of the holes 30 in the nut cage 3 can be further uniformized, and the strength of the nut cage 3 can be prevented from being lowered.

In the above description, 20 rollers 4 are arranged. However, this does not particularly limit the number of rollers in the roller screw to which the present invention is applicable. Also, only a case in which all of the rollers 4 come in contact with the right flank face 21a has been described. Alternatively, the roller screw may be configured so that all of the rollers 4 come in contact with the left flank face 21b depending on a direction of a load exerted on the roller screw. Further, in the above configuration, in order to promote the uniformity of the load distribution, a case in which the number of rollers 4 in the respective roller groups 40 is equal to each other has been exemplified. Alternatively, the number of rollers 4 in the respective roller groups 10 may be different from each other.

Also, in the above respective embodiments, assuming that the load is exerted on the screw shaft 2 or the nut cage 3 in only one direction (that is, only a direction along which the rollers 4 come in contact with the right flank face 21a), the roller screw in which all of the rollers 4 come in contact with the right flank face 21a is configured. However, when the load is exerted on the screw shaft 2 or the nut cage 3 from both of axial directions of the roller screw, a plurality of roller groups each having a plurality of rollers 4 that come in contact with the left flank face 21b may be added to the configurations of the above-mentioned embodiments. In this case, the number of roller groups having the rollers 4 that contact with the right flank face 21a, and the number of roller groups having the rollers 4 that contact with the left flank face 21b may be different from each other according to a magnitude of the exerted load.

LIST OF REFERENCE SIGNS

1 . . . roller screw,
2 . . . screw shaft,
3 . . . nut cage (nut),
4 . . . roller;
5 . . . roller bearing,
6 . . . retaining ring,
20 . . . thread (spiral groove),
21 . . . flank face,
21a . . . right flank face,
21b . . . left flank face,
30 . . . hole,
31 . . . retaining ring groove,
40 . . . roller group,
41 . . . rolling portion,
42 . . . shaft portion,
45 . . . recess 45,
C . . . virtual cylinder, and
I . . . intersection point.

The invention claimed is:
1. A roller screw comprising:
a screw shaft;
a plurality of rollers that roll on a flank face of the screw shaft; and
a cage that rotatably houses the plurality of rollers,
wherein a plurality of roller groups, each having a plurality of the rollers that roll on said flank face of the screw shaft and that are arranged at equal intervals while contacting said flank face of the screw shaft along a spiral groove of the screw shaft for one lead, are provided, wherein the plurality of roller groups are arranged at intervals in the axial direction of the screw shaft, wherein diameters of the rollers included in the plurality of roller groups are larger than pitches of the screw shaft, wherein the number of rollers in the respective roller groups is equal to each other, and wherein when one roller group of the plural roller groups, and another roller group adjacent to the one roller group are viewed from the axial direction of the screw shaft, arrangement positions of the plural rollers in both of the one roller group and the another roller group are different from each other.

2. The roller screw according to claim 1, wherein if the respective numbers of rollers in the one roller group and the another roller group are N, when the one roller group and the another roller group are viewed from the axial direction of the screw shaft, the arrangement positions of the plural rollers in both of the one roller group and the another roller group are displaced from each other by $\pi/N$.

3. The roller screw according to claim 1, wherein when a cylinder having the same center axis as that of the screw shaft, and having a cylindrical surface intersecting with contact portions of the plurality of rollers with the flank face is virtually set, distances from two points at which two adjacent rollers in the one roller group intersect with the virtual cylinder to an intersection point of a roller located between the two adjacent rollers with the virtual cylinder when the another roller group is viewed from the axial direction of the screw shaft are equal to each other.

4. The roller screw according to claim 1, wherein the number of rollers in the respective roller groups is four or more.

5. The roller screw according to claim 1, wherein the number of rollers in the respective roller groups is a maximum number of the rollers that can be arranged in the spiral groove of the screw shaft for one lead.

* * * * *